(12) United States Patent
Hamlin

(10) Patent No.: US 6,691,198 B1
(45) Date of Patent: Feb. 10, 2004

(54) AUTOMATICALLY TRANSMITTING SCHEDULING DATA FROM A PLURALITY OF STORAGE SYSTEMS TO A NETWORK SWITCH FOR SCHEDULING ACCESS TO THE PLURALITY OF STORAGE SYSTEMS

(75) Inventor: Christopher L. Hamlin, Los Gatos, CA (US)

(73) Assignee: Western Digital Ventures, Inc., Lake Forest, CA (US)

(*) Notice: Subject to any disclaimer, the term of this patent is extended or adjusted under 35 U.S.C. 154(b) by 0 days.

(21) Appl. No.: 09/539,513

(22) Filed: Mar. 30, 2000

(51) Int. Cl.[7] ............................................. G06F 13/14
(52) U.S. Cl. .................. 710/305; 710/240; 710/300; 710/317; 710/316; 711/147; 711/148; 711/149; 709/102
(58) Field of Search ................................ 710/305, 300, 710/2, 5, 316, 317, 240; 711/113, 112, 4, 158, 147, 148, 149; 709/213, 102; 360/71; 340/2.2; 326/41

(56) References Cited

U.S. PATENT DOCUMENTS

| | | | |
|---|---|---|---|
| 4,973,956 A | * 11/1990 | Lin et al. ...................... | 340/2.2 |
| 5,345,347 A | * 9/1994 | Hopkins et al. ............... | 360/71 |
| 5,390,313 A | * 2/1995 | Yanai et al. .................. | 711/112 |
| 5,410,300 A | * 4/1995 | Gould et al. .................. | 340/2.2 |
| 5,412,666 A | 5/1995 | Squires et al. | |
| 5,444,583 A | 8/1995 | Ehrlich et al. | |
| 5,465,056 A | * 11/1995 | Hsieh et al. ................... | 326/41 |
| 5,530,814 A | * 6/1996 | Wong et al. ................. | 710/317 |
| 5,548,795 A | 8/1996 | Au | |
| 5,586,306 A | 12/1996 | Romano et al. | |
| 5,696,931 A | 12/1997 | Lum et al. | |
| 5,729,718 A | 3/1998 | Au | |
| 5,737,747 A | * 4/1998 | Vishlitzky et al. .......... | 711/113 |
| 5,761,692 A | * 6/1998 | Ozden et al. ................... | 711/4 |
| 5,787,482 A | * 7/1998 | Chen et al. ................. | 711/158 |
| 5,819,310 A | 10/1998 | Vishlitzky et al. | |
| 5,854,941 A | * 12/1998 | Ballard et al. ................. | 710/5 |
| 5,909,336 A | 6/1999 | Schaffner et al. | |
| 5,909,564 A | * 6/1999 | Alexander et al. .......... | 710/316 |
| 5,909,691 A | 6/1999 | Schultz et al. | |
| 5,941,972 A | * 8/1999 | Hoese et al. .................... | 710/2 |
| 5,996,014 A | 11/1999 | Uchihori et al. | |
| 6,128,717 A | 10/2000 | Harrison et al. | |
| 6,421,711 B1 | * 7/2002 | Blumenau et al. .......... | 709/213 |

OTHER PUBLICATIONS

Vincent P.Heuring, Harry F. Jordan, Computer Systems Design and Architecture, 1997, Addison–Wesley, pp. 420–423.*

Vincent P.Heuring, Harry F. Jordan, Computer Systems Design and Architecture, 1997, Addison–Wesley, pp. 420–423.*

Vincent P.Heuring, Harry F. Jordan, Computer Systems Design and Architecture, 1997, Addison–Wesley, pp. 420–423.*

U.S. patent application Ser. No. 09/300,179, "Disk Drive Having a Register Set for Providing Real Time Position Variables to a Host".

* cited by examiner

Primary Examiner—Gopal C. Ray
Assistant Examiner—Justin King
(74) Attorney, Agent, or Firm—Milad G. Shara, Esq.; Howard H. Sheerin, Esq.

(57) ABSTRACT

A network switch is disclosed for resolving requests from a plurality of host initiators by scheduling access to a plurality of storage systems. The network switch comprises a plurality of multi-port switches interconnected to form a switched fabric, the multi-port switches for routing requests to the plurality of storage systems and for receiving scheduling data from each of the plurality of storage systems. The network switch further comprises a memory for storing the scheduling data, and a microprocessor, responsive to the scheduling data stored in the memory, for executing a scheduling algorithm to schedule the requests. The scheduling data is transferred automatically from each storage system to the memory through the multi-port switches without the microprocessor requesting the scheduling data from each storage system.

8 Claims, 5 Drawing Sheets

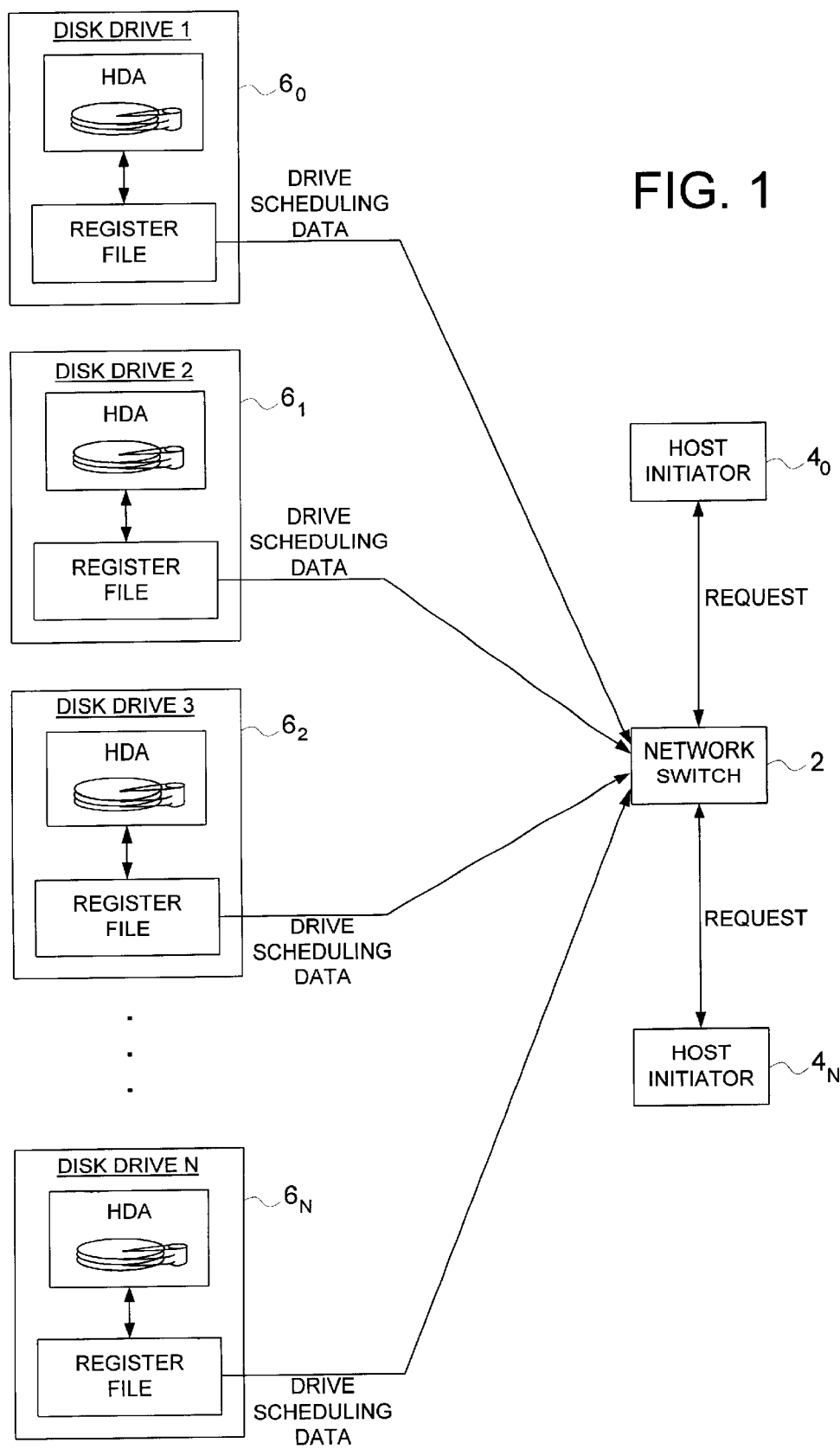

AUTOMATICALLY TRANSMITTING SCHEDULING DATA FROM A PLURALITY OF STORAGE SYSTEMS TO A NETWORK SWITCH FOR SCHEDULING ACCESS TO THE PLURALITY OF STORAGE SYSTEMS

BACKGROUND OF THE INVENTION

1. Field of the Invention

The present invention relates to network systems. More particularly, the present invention relates to a network system wherein scheduling data is automatically transferred from a plurality of storage systems to a network switch for scheduling access to the plurality of storage systems.

2. Description of the Prior Art

Conventional disk drive storage systems typically employ a scheduling algorithm in order to optimize data throughput. For example, a scheduling algorithm may evaluate and prioritize access requests rather than service the requests on a "first come first serve" basis. The scheduling priority is typically based on certain temporal parameters of the disk drive, such as the radial position of the head with respect to the disk. A scheduling algorithm may, for example, service all of the access requests from the outer to inner diameter tracks before servicing access requests from the inner to outer diameter tracks, similar to an elevator in a building servicing all of the down requests before servicing up requests. This algorithm is appropriately referred to as the "elevator" algorithm.

It is known to use temporal parameters of a disk drive (e.g., the radial or rotational position of the head) in order to perform the scheduling operations; however, these types of scheduling algorithms have in the past been implemented by a disk controller which has direct access to the temporal parameters. For example, U.S. Pat. No. 5,390,313 discloses a disk drive comprising a disk controller for scheduling access to multiple disks based on the rotational position of the heads relative to the disks. Co-pending U.S. patent application Ser. No. 09/300,179 discloses a disk drive which provides head position information to a host computer so that the host microprocessor may execute the scheduling algorithm rather than the disk controller. U.S. Pat. No. 5,787,482 discloses a video server wherein access requests to a plurality of disk drives are scheduled based on an inferred radial position of the head within each disk drive. The radial position of the head is inferred based on commands previously sent to each disk drive. However, using inferred temporal parameters to implement the scheduling algorithm provides sub-optimal performance due to the error inherent in estimation. Further, it is difficult to minimize the variance in latency associated with generating the temporal parameters due to the estimation error as well as the variance in computing the temporal parameters, which further degrades performance of the scheduling algorithm. Consequently, scheduling algorithms based on inferred temporal parameters are sub-optimal with respect to the aggregate performance of a computer network, and particularly the number of input/output operations per second (IOPs) performed by each disk drive connected to the computer network.

There is, therefore, a need to improve upon the prior art techniques of scheduling access to a plurality of storage systems, such as a plurality of disk drives, connected to a computer network. In particular, there is a need to schedule access to a plurality of storage systems connected to a computer network in a manner which minimizes the variance in latency associated with generating the temporal parameters, thereby improving the computer network's aggregate performance.

SUMMARY OF THE INVENTION

The present invention may be regarded as a network switch for resolving requests from a plurality of host initiators by scheduling access to a plurality of storage systems. The network switch comprises a plurality of multi-port switches interconnected to form a switched fabric, the multi-port switches for routing requests to the plurality of storage systems and for receiving scheduling data from each of the plurality of storage systems. The network switch further comprises a memory for storing the scheduling data, and a microprocessor, responsive to the scheduling data stored in the memory, for executing a scheduling algorithm to schedule the requests. The scheduling data is transferred automatically from each storage system to the memory through the multi-port switches without the microprocessor requesting the scheduling data from each storage system.

The present invention may also be regarded as a network method of resolving requests from a plurality of host initiators by scheduling access to a plurality of storage systems. The network method comprises the steps of routing requests to the plurality of storage systems and receiving scheduling data from each of the plurality of storage systems through a plurality of multi-port switches interconnected to form a switched fabric. The scheduling data is stored in memory, and the requests are scheduled using the stored scheduling data. The scheduling data is transferred automatically from each storage system to the memory through the multi-port switches without requesting the scheduling data from each storage system.

BRIEF DESCRIPTION OF THE DRAWINGS

FIG. 1 shows a network system according to an embodiment of the present invention comprising a network switch for resolving requests received from a plurality of host initiators by scheduling access to a plurality of storage systems, such as a plurality of disk drives, which automatically provide scheduling data to the network switch.

DESCRIPTION OF THE PREFERRED EMBODIMENTS

Figure 2:
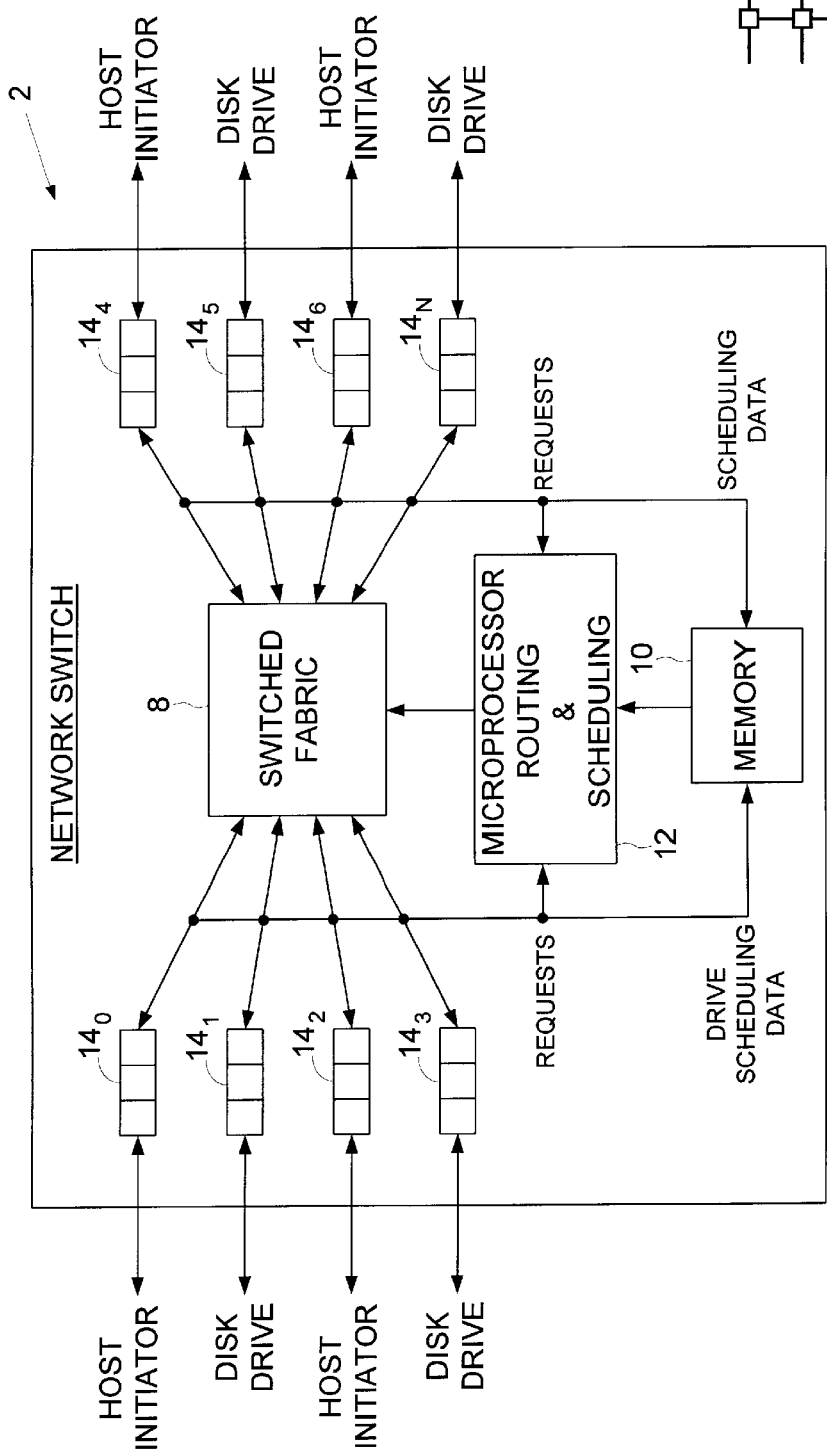
FIG. 2 shows details of the network switch of FIG. 1, including a plurality of multi-port switches interconnected to form a switched fabric, the multi-port switches for routing requests to the plurality of storage systems and for receiving scheduling data from each of the plurality of storage systems, a memory for storing the scheduling data, and a microprocessor, responsive to the scheduling data stored in the memory, for executing a scheduling algorithm to schedule the requests.

FIG. 1 shows a network switch 2 for resolving requests from a plurality of host initiators $4_0$–$4_N$ by scheduling access to a plurality of storage systems, such as a plurality of disk drives $6_0$–$6_N$. FIG. 2 shows that the network switch 2 comprises a plurality of multi-port switches interconnected to form a switched fabric 8, the multi-port switches for routing requests to the plurality of storage systems and for receiving scheduling data from each of the plurality of storage systems. The network switch 8 further comprises a memory 10 for storing the scheduling data, and a microprocessor 12, responsive to the scheduling data stored in the memory 10, for executing a scheduling algorithm to schedule the requests. The scheduling data is transferred automatically from each storage system to the memory 10 through the multi-port switches without the microprocessor 12 requesting the scheduling data from each storage system.

The microprocessor 12 in the network switch 2 executes a conventional routing algorithm for routing requests (messages) between the nodes in the network (the storage systems, host initiators, etc.). The network switch 2 comprises buffers $14_0$–$14_N$ which buffer the requests before and after the requests are transmitted through the switched fabric 8. In one embodiment, a request consists of a packet having a packet header comprising routing data which identifies the destination node for the packet. The microprocessor 12 processes the packet header in order to route the packet through the switched fabric 8. A suitable routing algorithm implemented by the microprocessor 12 generates control data for configuring the multi-port switches within the switched fabric 8. Any suitable routing algorithm may be implemented by the network switch 2, and it may support Unicast or Multicast Routing. The routing decisions may be made centrally, at the source, distributed, or multiphase, implemented using a lookup table or using a finite-state machine. Further, the routing algorithm may be deterministic or adaptive. A discussion of various routing algorithms which may be employed in the embodiments of the present invention is provided by Jose Duato et al. in the text book "Interconnection Networks, an Engineering Approach", IEEE Computer Society, 1997.

Figure 3:
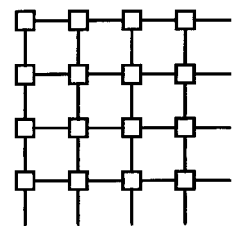
FIG. 3 shows an example topology for the switched fabric of FIG. 2 wherein the plurality of multi-port switches form a crossbar network.

The routing algorithm is implemented a layer "above" the switching layer, and thus the routing algorithm may be compatible with various different switching algorithms, for example, Virtual Cut-Through Switching, Wormhole Switching, and Mad Postman Switching. The switching layer is implemented by the switched fabric 8 using a plurality of multi-port switches. FIG. 3 illustrates an example topology for the multi-port switches: a crossbar network which allows any node in the network to communicate with any other node so that many nodes can communicate simultaneously without contention. In an alternative embodiment, the multi-port switches are configured to form a plurality of switch stages, wherein each individual switch stage is a crossbar network, and the number of switch stages and connection patterns between switch stages determines the routing capability of the network switch 2. In the crossbar network of FIG. 3, each switching element comprises up to four ports (North, South, East and West); however, switching elements comprising fewer or more ports may also be employed. In addition, topologies other than a crossbar network may be employed to implement the switching layer. Various topologies and switching algorithms which may be employed in the embodiments of the present invention are discussed in the aforementioned text book by Jose Duato et al.

The scheduling data stored in the memory 10 of FIG. 2 is received automatically from each storage system so as to make more efficient use of the microprocessor 12 bandwidth. The microprocessor 12 processes the scheduling data to schedule access to each storage system. For example, in one embodiment the network switch 2 implements a network file system for the host initiators $4_0$–$4_N$. The network file system may support "data mirroring" and/or "data striping" using a plurality of the storage systems to enhance performance in terms of throughput and data security. When a host initiator sends a request to the network switch 2 to access a file (read or write), the microprocessor 12 selects the most appropriate storage system or storage systems to service the request based on the scheduling data stored in the memory 10.

The microprocessor 12 may implement any suitable scheduling algorithm. For example, the microprocessor 12 may implement an elevator or SCAN algorithm wherein the head within a disk drive storage system sweeps the entire surface of the disk, visiting the outermost cylinders before reversing direction and sweeping back to the inner most cylinders. Another suitable scheduling algorithm is the circular SCAN algorithm wherein requests are only satisfied when the head is traveling in one direction across the surface of the disk. The microprocessor 12 will evaluate the scheduling data (e.g., the current radial location of the head in each disk drive) to prioritize the requests received from the host initiators and to select the most appropriate disk drive or drives to service each request.

Figure 4:
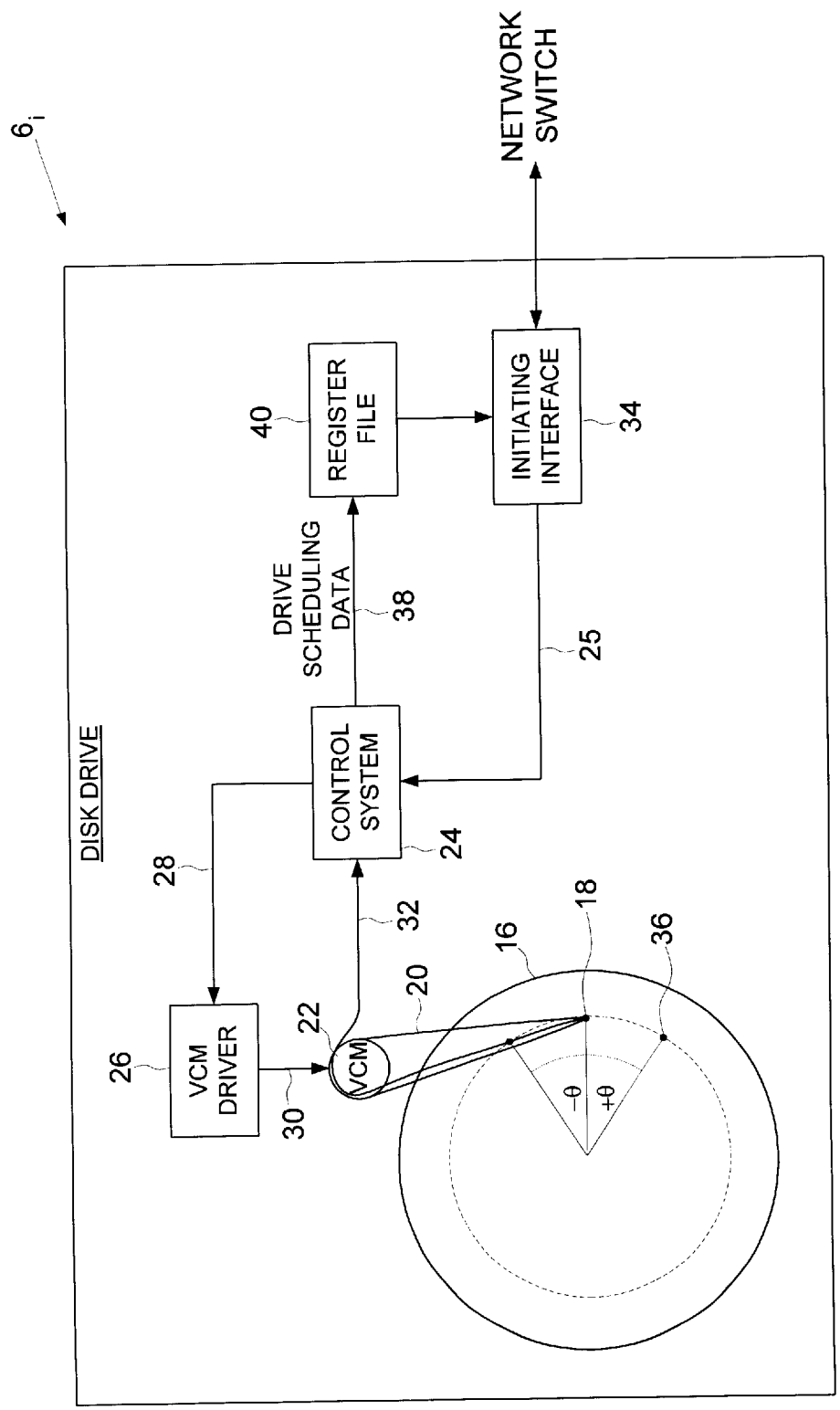
FIG. 4 shows details of a disk drive storage system connected to the network switch, the disk drive comprising a control system for performing servo control operations and for storing scheduling data in a register file, and an initiating interface for automatically transmitting the scheduling data to the network switch.

FIG. 4 shows details of a suitable disk drive $6_i$ for use in the embodiment of FIG. 1, particularly the circuitry which facilitates the storing and transferring of scheduling data to the network switch 2. The disk drive $6_i$ comprises one or more disks 16 rotated about a spindle, wherein the surface of the disk 16 is divided into a plurality of concentric, radially spaced tracks. Each track is further divided into a plurality of data blocks referred to as data sectors for storing user data. A head 18 connected to the distal end of an actuator arm 20 is positioned radially over the disk 16 by a voice coil motor (VCM) 22 which rotates the actuator arm 20 about a pivot. A control system 24 receives over line 25 requests from the network switch 2 to store user data to or retrieve user data from the disk 16. The control system 24 responds to the requests by positioning the head 18 over the track comprising the target data sector. The head positioning function is carried out by a VCM driver circuit 26 which receives control commands 28 from the control system 24 and generates a VCM driving signal 30 applied to the VCM 22.

Also recorded on the tracks and interleaved with the data sectors are embedded servo sectors which store servo data for use in positioning the head 18 radially over the disk 16. The servo data typically includes a track address which identifies the radial location of each track. When the head 18 passes over an embedded servo sector, the control system 24 processes the resulting read signal 32 to detect the track address and thereby derive the radial position of the head 18. The control system 24, VCM driver 26, VCM 22, actuator arm 20, head 18 and embedded servo sectors thus form a closed loop servo control system with the position of the head relative to a target track as the command input.

The servo data in the embedded servo sectors also includes information used to derive the circumferential position of the head 18 with respect to the disk 16. For example, an index mark 36 may be recorded in one of the embedded servo sectors which generates an index pulse in the read signal 32 once per revolution. The control system 24 thus derives a circumferential position of the head 18 relative to when the index mark 36 is detected.

As the control system 24 generates the control commands 28 applied to the VCM driver 26 and derives the current radial and circumferential position of the head 18 from the embedded servo sectors and the index mark 36, the head position information is stored as scheduling data 38 in a register file 40. At a predetermined periodic interval, the scheduling data is automatically transferred from the register file 40 to the network switch 2 through an initiating interface 34 of the disk drive $6_i$. The scheduling data is automatically transferred through the multi-port switches of the switched fabric 8 and stored in the memory 10 of the network switch 2 shown in FIG. 2 without the microprocessor 12 requesting the scheduling data from the disk drive $6_i$. The microprocessor 12 within the network switch 2 processes the scheduling data stored in the memory 10 in order to schedule requests to each of the disk drives $6_0$–$6_N$.

Figure 5:
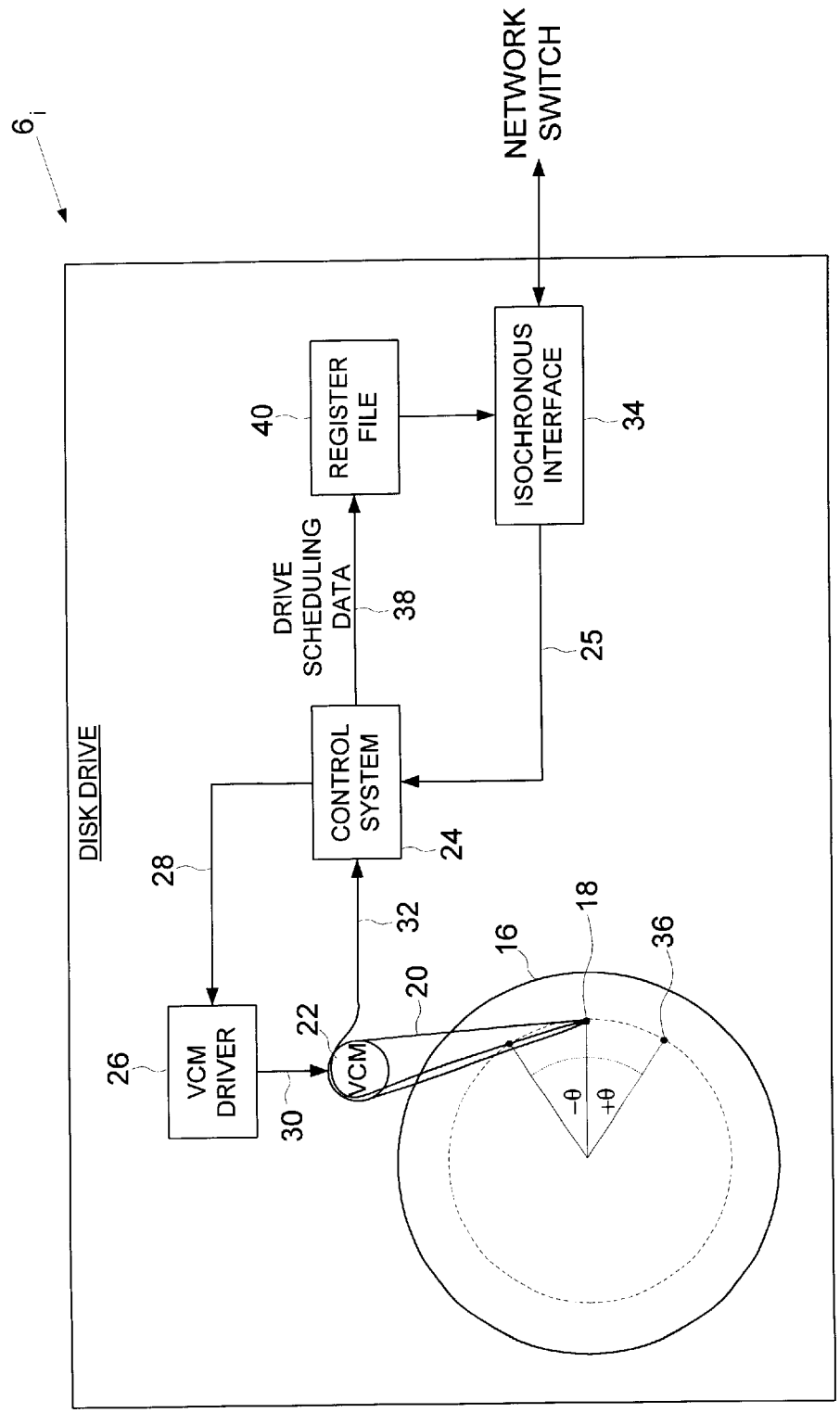
FIG. 5 illustrates that in one embodiment, the initiating interface in each storage system is an isochronous interface.

In one embodiment, the initiating interface 34 is an isochronous interface 34 as shown in FIG. 5 which provides for periodic, automatic data transfer from the disk drive $6_i$ to the network switch 2. A suitable integrated circuit for implementing the isochronous interface 34 is the Texas Instruments TSB12LV41A link-layer controller (LLC) which supports the IEEE 1394 specification for high-performance serial bus with automatic generation of the common isochronous packet headers and timestamping as required by the IEC 61883 standard. The TSB12LV41A link-layer controller (LLC) also implements asynchronous data transfer, a feature which may also be employed by the network switch 2 in communicating with the disk drive $6_i$. For example, the scheduling data may be transferred isochronously from the disk drive $6_i$ to the memory 10 in the network switch 2, whereas user data associated with access requests may be transferred to or from the disk drive $6_i$ asynchronously.

Figure 6:
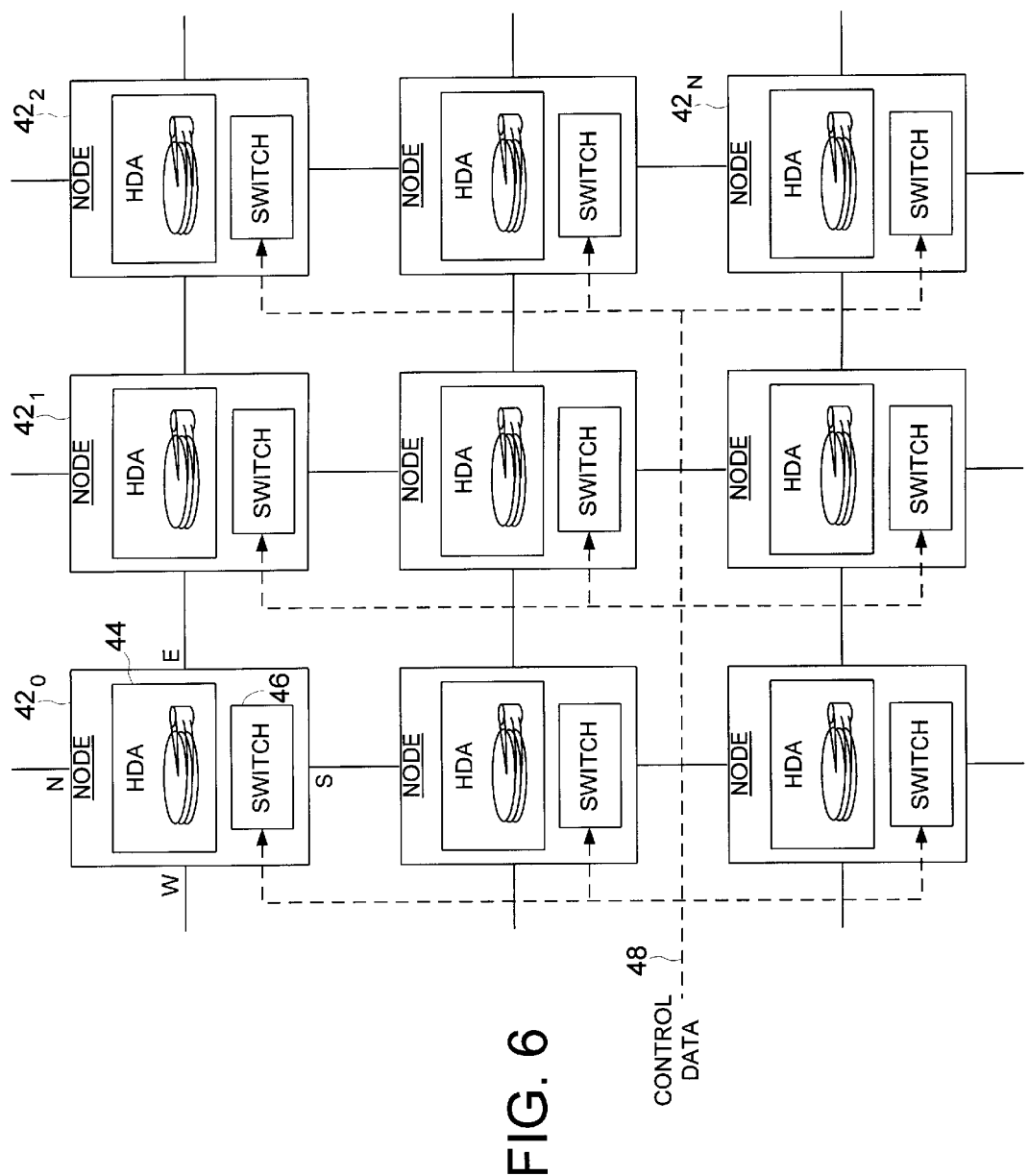
FIG. 6 shows an alternative embodiment of the present invention wherein each storage system of FIG. 1 comprises a switch interface to form at least part of the switched fabric for the network switch.

In an alternative embodiment of the present invention, each storage system, such as each disk drive $6_0$–$6_N$ of FIG. 1, comprises a switch interface to form at least part of the switched fabric 8 in the network switch 2 of FIG. 2. This embodiment is illustrated in FIG. 6 for the crossbar network of FIG. 3, wherein each node $42_O$–$42_N$ in the crossbar network is suitably implemented using a storage system, such as a disk drive comprising a head disk assembly (HDA) 44 for housing one or more disks for storing data and one or more heads actuated over the disks for recording or retrieving data. Each storage system further comprises a switch interface for interfacing to a switch element 46 which controls the data paths between the four ports (N, S, E, W) in each node $42_O$–$42_N$ of the crossbar network. The switch element 46 may or may not be integrated with the HDA 44.

The microprocessor 12 in the network switch 2 of FIG. 2 generates control data applied over line 48 to the switch elements 46 in each node $42_O$–$42_N$ of FIG. 6 in order to govern the data paths adopted between the ports (N, S, E, W) according to the routing decisions of the routing and scheduling algorithm. The scheduling data is automatically transferred from the register file 40 of each storage system through a selected port (N, S, E, W) and through one or more nodes of the switching layer where it is ultimately stored in the memory 10 of the network switch 2.

The non-blocking behavior of swtiched fabric networks facilitates a deterministic scheduling algorithm by minimizing the variance in latency associated with generating and communicating the temporal parameters of each storage system to the memory 10 in the network switch 2. Performance in this respect is further improved by communicating the temporal parameters to the memory 10 using an isochronous communication protocol which guarantees the temporal parameters are updated according to a selected periodic time interval.

I claim:

1. A network switch for resolving requests from a plurality of host initiators by scheduling access to a plurality of storage systems, the network switch comprising:

(a) a plurality of multi-port switches interconnected to form a switched fabric, the multi-port switches for routing requests to the plurality of storage systems and for receiving scheduling data from each of the plurality of storage systems; and (b) a memory for storing the scheduling data; and (c) a microprocessor, responsive to the scheduling data stored in the memory, for executing a scheduling algorithm to schedule the requests;

wherein:
the scheduling data is transferred automatically from each storage system to the memory through the multi-port switches without the microprocessor requesting the scheduling data from each storage system; and
each storage system comprises a disk drive comprising a disk and a head; and
the scheduling data comprises a radial location of the head relative to the disk within each disk drive; and
routing requests to plurality of storage systems.

2. The network switch as recited in claim 1, wherein the scheduling data comprises a circumferential location of the head relative to the disk within each disk drive.

3. The network switch as recited in claim 1, wherein each storage system comprises an isochronous interface for periodically transferring the scheduling data to the memory.

4. The network switch as recited in claim 1, wherein each storage system comprises a switch interface to form at least part of the switched fabric.

5. In a network switch, a method of resolving requests from a plurality of host initiators by scheduling access to a plurality of storage systems, the method comprising the steps of:

(a) routing requests to the plurality of storage systems and receiving scheduling data from each of the plurality of storage systems through a plurality of multi-port switches interconnected to form a switched fabric; and (b) storing the scheduling data in a memory; and (c) scheduling the requests to the plurality of storage systems in response to the scheduling data stored in the memory;

wherein:

the scheduling data is transferred automatically from each storage system to the memory through the multi-port switches without requesting the scheduling data from each storage system; and each storage system comprises a disk drive comprising a disk and a head;

the scheduling data comprises a radial location of the head relative to the disk within each disk drive; and routing requests to the plurality of storage systems.

6. The method of resolving requests as recited in claim 5 wherein the scheduling data comprises a circumferential position of the head relative to the disk within each disk drive.

7. The method of resolving requests as recited in claim 5, wherein each storage system comprises an isochronous interface for periodically transferring the scheduling data to the memory.

8. The method of resolving requests as recited in claim 5, wherein each storage system comprises a switch interface to form at least part of the switched fabric.

* * * * *